(12) United States Patent
Kang et al.

(10) Patent No.: US 11,674,714 B2
(45) Date of Patent: Jun. 13, 2023

(54) AIR PURIFIER

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jiyoung Kang, Seoul (KR); Haeyoong Chung, Seoul (KR); Jongkeon Jeon, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 565 days.

(21) Appl. No.: 16/815,663

(22) Filed: Mar. 11, 2020

(65) Prior Publication Data

US 2020/0300502 A1    Sep. 24, 2020

(30) Foreign Application Priority Data

Mar. 19, 2019  (KR) .......................... 10-2019-0031443

(51) Int. Cl.
  *F24F 13/20*    (2006.01)
  *F24F 1/028*    (2019.01)
  (Continued)

(52) U.S. Cl.
  CPC .............. *F24F 13/20* (2013.01); *F24F 1/028* (2019.02); *F24F 13/28* (2013.01);
  (Continued)

(58) Field of Classification Search
  CPC ............ F24F 1/028; F24F 1/035; F24F 13/20; F24F 13/28; F24F 3/16; F24F 8/10; F24F 8/80;
  (Continued)

(56) References Cited

U.S. PATENT DOCUMENTS

| 4,488,888 A | * | 12/1984 | Doyle | ..................... F24F 13/28 55/504 |
| 10,508,658 B2 | | 12/2019 | Park et al. | |

(Continued)

FOREIGN PATENT DOCUMENTS

| CN | 1510349 | 7/2004 |
| CN | 1727774 | 2/2006 |

(Continued)

OTHER PUBLICATIONS

Machine translation of CN205619461 (Year: 2016).*

(Continued)

*Primary Examiner* — Joseph F Trpisovsky
(74) *Attorney, Agent, or Firm* — Ked & Associates, LLP

(57) ABSTRACT

An air purifier includes a first case and a second case that are insertably coupled such that the second case slides up and down with respect to the first case. The first case may suction air through a suction space provided at a bottom and a plurality of holes formed in a side wall. The second case may include a discharge grill provided at a top end through which air is discharged and a plurality of holes formed in a side wall through which air is suctioned when the second case is moved down to a first position and through which air is discharged when the second case is moved up to a second position. The top discharge grill may be opened and closed. The second case may also include a side discharge portion formed in the side wall above the plurality of holes. The side discharge portion may be opened and closed.

17 Claims, 14 Drawing Sheets

(51) Int. Cl.
*F24F 13/28* (2006.01)
*F24F 1/035* (2019.01)
*B01D 46/00* (2022.01)
*F24F 3/16* (2021.01)
*F24F 8/80* (2021.01)
*F24F 8/10* (2021.01)
*F24F 8/108* (2021.01)

(52) U.S. Cl.
CPC .......... *B01D 46/0004* (2013.01); *F24F 1/035* (2019.02); *F24F 3/16* (2013.01); *F24F 8/10* (2021.01); *F24F 8/108* (2021.01); *F24F 8/80* (2021.01); *F24F 2203/1012* (2013.01)

(58) Field of Classification Search
CPC ................ F24F 8/108; B01D 64/0004; B01D 64/0005
See application file for complete search history.

(56) References Cited

U.S. PATENT DOCUMENTS

| | | | |
|---|---|---|---|
| 2004/0118289 | A1 | 6/2004 | Chang et al. |
| 2005/0268583 | A1 | 12/2005 | Han |
| 2017/0246581 | A1 | 8/2017 | Jung et al. |
| 2017/0360980 | A1 | 12/2017 | Jakins |
| 2018/0264157 | A1 | 9/2018 | Benedek |
| 2019/0331137 | A1 | 10/2019 | Xiao |

FOREIGN PATENT DOCUMENTS

| | | |
|---|---|---|
| CN | 201662192 | 12/2010 |
| CN | 102221241 | 10/2011 |
| CN | 204519811 | 8/2015 |
| CN | 204687868 | 10/2015 |
| CN | 105333528 | 2/2016 |
| CN | 105571104 | 5/2016 |
| CN | 205619461 | 10/2016 |
| CN | 106290967 | 1/2017 |
| CN | 106 422 551 | 2/2017 |
| CN | 106765653 | 5/2017 |
| CN | 106871249 | 6/2017 |
| CN | 106940078 | 7/2017 |
| CN | 206377768 | 8/2017 |
| CN | 206929937 | 1/2018 |
| CN | 107763750 | 3/2018 |
| CN | 107763754 | 3/2018 |
| CN | 107975878 | 5/2018 |
| CN | 207395002 | 5/2018 |
| CN | 108111060 | 6/2018 |
| CN | 108626867 | 10/2018 |
| CN | 108800333 | 11/2018 |
| CN | 208222678 | 12/2018 |
| CN | 208296183 | 12/2018 |
| CN | 109340945 | 2/2019 |
| EP | 1 437 169 | 7/2004 |
| EP | 3 211 345 | 8/2017 |
| JP | S53-159152 | 12/1978 |
| JP | H09-178259 | 7/1997 |
| JP | 2005-288327 | 10/2005 |
| JP | 2011-106788 | 6/2011 |
| KR | 10-2006-0112758 | 11/2006 |
| KR | 10-0933634 | 12/2009 |
| KR | 10-2017-0044542 | 4/2017 |
| KR | 10-2017-0044543 | 4/2017 |
| KR | 10-2026194 | 11/2019 |
| WO | WO 2013/176213 | 11/2013 |
| WO | WO 2017/074128 | 5/2017 |
| WO | WO 2018/110730 | 6/2018 |

OTHER PUBLICATIONS

Machine translation of CN 1727774 (Year: 2006).*
Machine translation of 107763754 (Year: 2018).*
Chinese Office Action dated Apr. 6, 2021 issued in Application No. 202010175621.9.
U.S. Office Action dated Feb. 11, 2022 issued in U.S. Appl. No. 16/815,573.
European Search Report dated Aug. 12, 2020 issued in EP Application No. 20163817.8.
European Search Report dated Aug. 12, 2020 issued in EP Application No. 20163887.1.
European Search Report dated Aug. 20, 2020 issued in Application No. 20164336.8.
Chinese Office Action dated Jun. 3, 2021 issued in Application No. 202010185182.X.
European Office Action dated Mar. 1, 2022 issued in EP Application No. 20164336.8.
U.S. Appl. No. 16/815,506, filed Mar. 11, 2020.
U.S. Appl. No. 16/815,573, filed Mar. 11, 2020.
U.S. Appl. No. 16/815,663, filed Mar. 11, 2020.
Chinese Office Action issued in Application No. 2021052802933960 dated Jun. 2, 2021.
Chinese Office Action issued in Application No. 202010175621.9 dated Jan. 6, 2022.

* cited by examiner

AIR PURIFIER

CROSS-REFERENCE TO RELATED APPLICATION(S)

This application claims priority under 35 U.S.C. § 119 to Korean Patent Application No. 10-2019-0031443, filed on Mar. 19, 2019, whose entire disclosure is hereby incorporated by reference.

BACKGROUND

1. Field

The present disclosure relates to an air purifier.

2. Background

An air purifier or cleaner may be a device that suctions contaminated air, purifiers the suctioned air, and then discharges the purified air. The air purifier may include a fan to suction ambient or outside air into an interior of the air purifier and a filter to filter dust, germs, and other foreign matter in the air. Generally, an air purifier is configured to purify an interior or indoor space such as a home or office.

Since the air purifier may have a fixed position in a room, an area capable of being purified by the air purifier may be limited depending on how air is discharged. Korean Registration No. 10-0933634 discloses an air purifier having an interior main body that is lifted up and down to purify air. When the main body is moved upward, air surrounding an upper side of the air purifier may be purified. When the main body is moved downward, air surrounding a lower side of the air purifier may be purified.

However, an operation of the air purifier of Korean Registration No. 10-0933634 may be restricted to upper and lower portions, limiting usability. The suction inlet or grill and discharge outlet or grill are provided on lateral surfaces of the main body, so air may not be blown upward or downward and may be rather limited. Clean or purified air therefore may not be easily supplied to a region above the air purifier.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
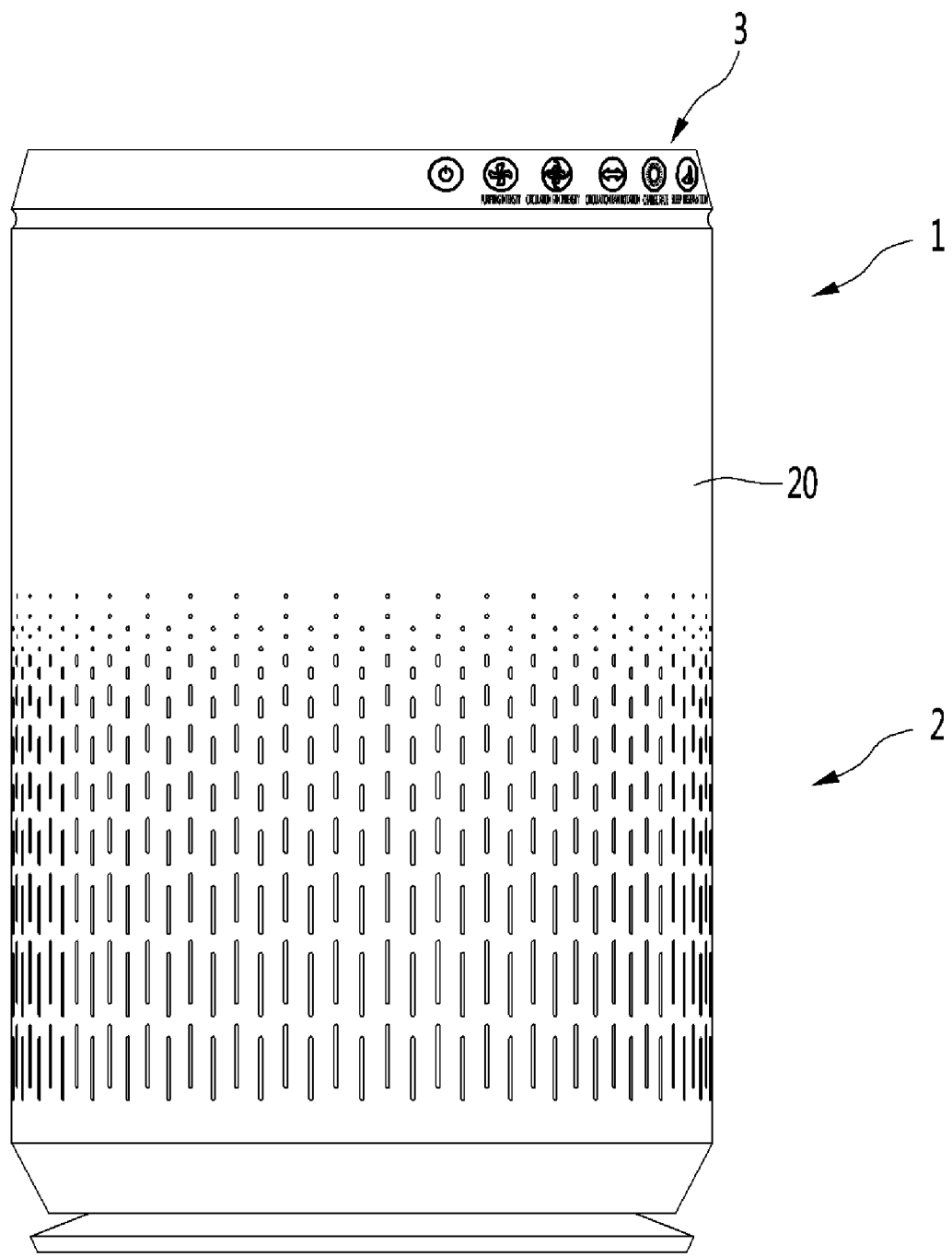
FIG. 1 is a front view of an air purifier or cleaner according to an embodiment in an initial state where a vertical length may be reduced.
Figure 2:
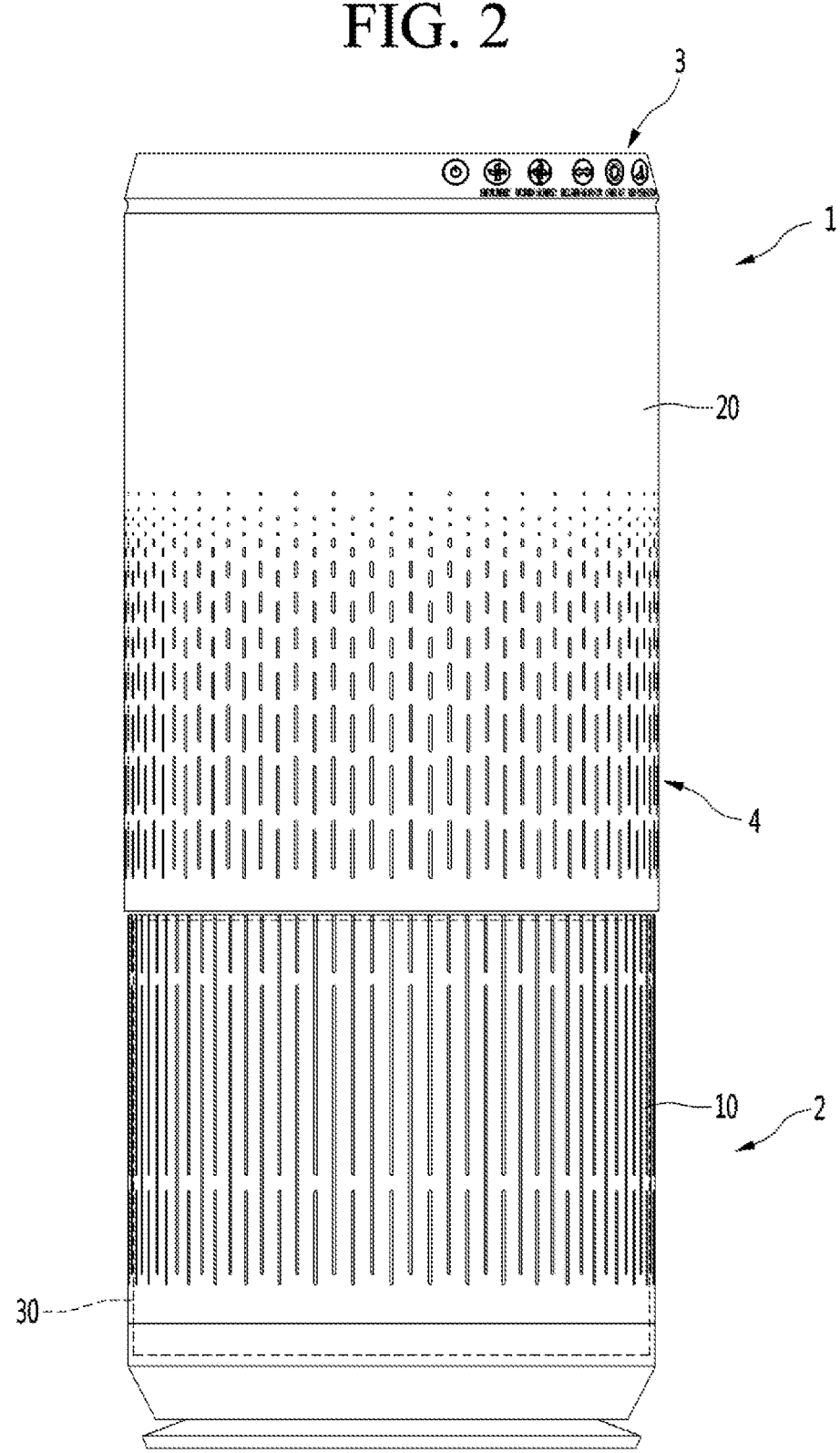
FIG. 2 is a view showing the air purifier of FIG. 1 in a lengthened state where the vertical length may be increased.

Referring to FIGS. 1 and 2, an air cleaner or purifier 1 according to an embodiment may include a first or lower case 10 and a second or upper case 20. The first and second cases 10 and 20 may have cylindrical shell shapes that are long in a vertical direction, but embodiments disclosed are not limited hereto. The first and second cases 10 and 20 may be stacked and overlapped with each other to form an exterior of the air purifier 1 having an adjustable length. Each of the first and second cases 10 and 20 may have a plurality of holes or openings formed at sides to form a suction portion 2. An upper discharge portion 3 may be provided at an upper portion of the air purifier 1 (e.g., on an upper portion of the second case 20) and an intermediate or side discharge portion 4 may be provided at an intermediate portion (e.g., on a side of the second case 20) of the air purifier 1. The plurality of holes or openings in the suction portion 2 may also be referred to as air intakes. The upper discharge portion may include at least one air outtake.

The second case 20 may be configured to insert onto the first case 10, and the first and second cases 10 and 20 may alternatively be referred to as inner and outer cases, respectively. The second case 20 may have a slightly larger diameter than that of the first case 10, and the first and second cases 10 and 20 may have a same or similar geometric center.

When the second case 20 is overlapped with the first case 10 by a maximum amount, a vertical length of the air purifier 1 may be in an initial or short state, as shown in FIG. 1. When the second case 20 is lifted upward to overlap by a lesser amount with the first case 10, the vertical length of the air purifier 1 may be lengthened. When the second case 20 overlaps with the first case 10 by a minimum amount, the air purifier 2 may be in a fully lengthened state, as shown in FIG. 2.

When the air purifier 1 is in the initial state, the suction portion 2 may be formed by the holes in both the first and second cases 10 and 20. Air may be suctioned through both the first case 10 and the second case 20. The holes of the first case 10 may not perfectly align with the holes of the second case 20, increasing a resistance to air flow. Alternatively, the holes of the first and second cases 10 and 20 may align and overlap with each other to reduce a resistance to air flow.

When the air purifier 2 is in the lengthened state, the holes of the second case 20 may not overlap with the holes of the first case 10. The suction portion 2 may be formed by the holes in the first case 10, while the holes in the second case 20 may form the side discharge portion 4. Air may be suctioned through the holes of the first case 10 (i.e., the suction portion 2) and discharged through the holes of the second case 20 (i.e., the side discharge portion 4). Details of the side discharge portion 4 will be described with reference to FIGS. 6 and 7.

In the lengthened state where the second case 20 is moved upward, a larger amount of ambient air (i.e., external air outside of the air purifier 1) may be suctioned, as there may be less resistance to a flow of air. The air may flow through the holes of the first case 10 without having first passed through the holes of the second case 20. A "power mode" may be when the air purifier 1 operates in the lengthened state. A "normal mode" may be when the air purifier 1 operates in the short or initial state where the second case 20 is moved downward to overlap with the first case. In the normal mode, suctioned air may face a greater resistance. The holes of the first case 10 and the holes of the second case 20 may have different sizes and/or shapes so as not to perfectly align. Details of the holes of the first and second cases 10 and 20 will be described later with reference to FIGS. 6 and 7.

Reference numeral 30 shown by a dotted line in FIG. 2 indicates an air cleaning or suctioning area. A fan 16 and a filter or filter assembly 12 (FIG. 3) may be provided inside of the air cleaning area to draw an airflow and filter foreign matter from the suctioned air. An internal structure of the air cleaning area will be described with reference to FIG. 3.

Figure 3:
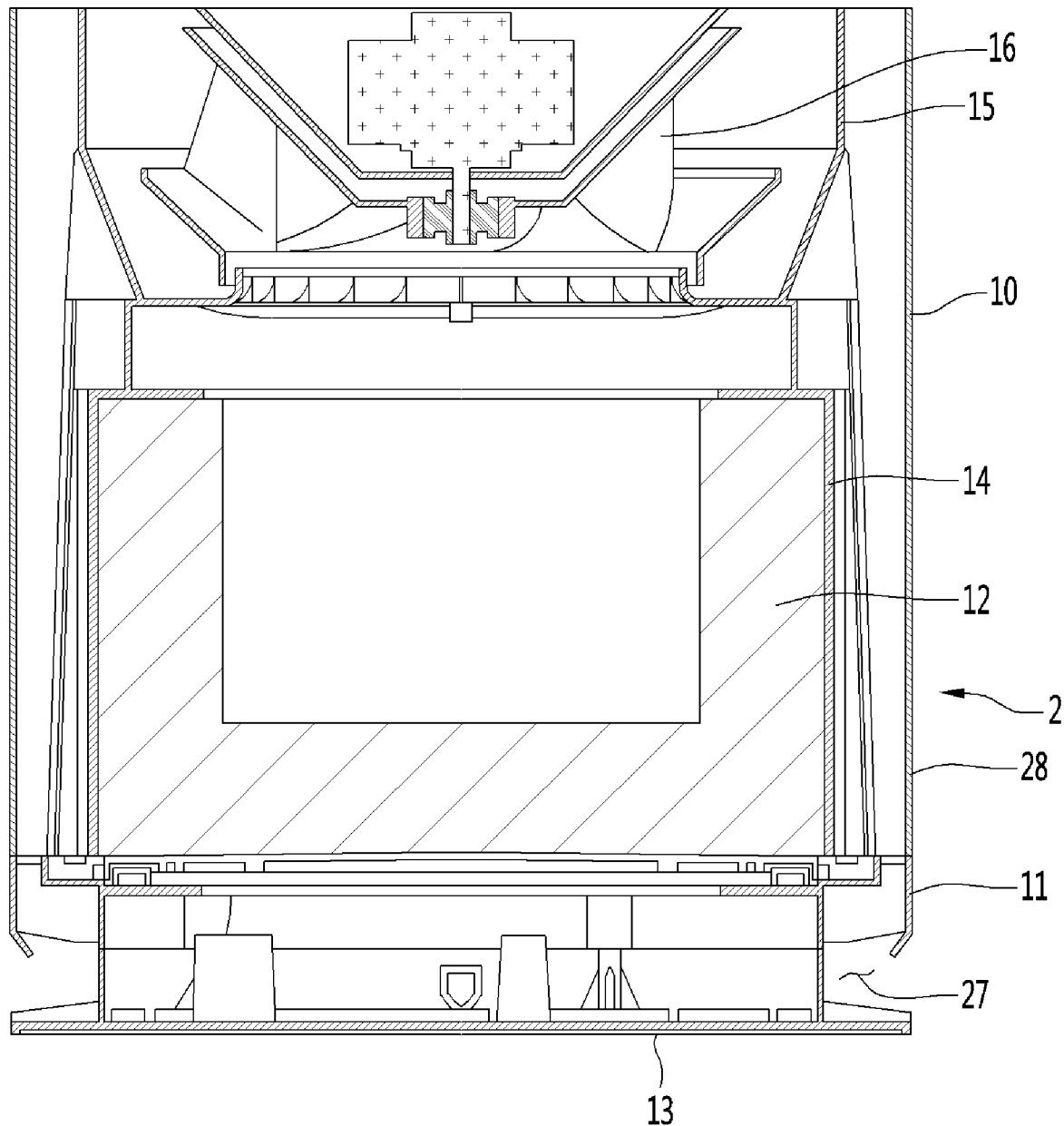
FIG. 3 is a cross-sectional view of an air cleaning area of an air purifier according to an embodiment.

Referring to FIG. 3, an axial direction of the fan may be in the vertical direction of the air purifier 1, while a radial direction may extend in a horizontal direction of the fan. The axial direction may correspond to a central axis direction (i.e., a motor axial direction) of the fan 16, i.e. The radial direction may be perpendicular to the axial direction. The circumferential direction may be an imaginary circular direction formed as a rotation about the axial direction by a fixed distance in the radial direction. Air flow may refer to a flow in which ambient air present near a lower portion of the air purifier 1 is suctioned, and clean air is discharged or exhausted.

The air purifier 1 may include a base 13 provided below and spaced apart from the first case 10. The base 13 may be placed on a floor or ground surface. A base suction space or portion 27 may be formed between a bottom of the first case 10 and a side or bottom of the base 13. The base 13 may have a concave curvature so as not to obstruct the base suction portion 27. Air may be suctioned upward or in an axial direction of the fan through the base suction portion 27. Such air may enter the air purifier 1 from under the first case 10.

A lower side portion of the first case 10 may include the holes of the first case 10. When the air purifier 1 is in the lengthened state, the suction portion 2 may be formed by a combination of the base suction portion 27 and the holes of the lower side portion 28. When the air purifier 1 is in the initial state, the suction portion 2 may be formed by a combination of the base suction portion 27, the holes of the lower side portion 28 of the first case 10, and the holes of the second case 20 (FIG. 1).

A filter 12 may be provided on an interior of the first case 10. Air passing through the lower side portion 28 of the first case 10 and the base suction portion 27 between the first case 10 and the base 13 may flow into an outer circumferential surface of the filter 12. The filter 12 may be a cylindrical body and may have a filter surface to filter air. However, shapes of the filter 12 are not limited to cylindrical shapes, and the filter 12 may alternatively have a rectangle or other shape. A shape of the filter 12 may correspond to an inner contour of the first case 10. The filter 12 may, for example, a HEPA filter, a carbon filter, a pleated filter, a mesh filter, a foam filter, etc. or any combination of these filters.

The filter 12 may have a rounded (e.g., cylindrical) outer contour so that air may flow through the filter 12 from any direction, or at least any radial direction, increasing a filtering area of the filter 12. The filter 12 may be provided as a solid cylinder or a cylindrical shell having a bottom surface so that air may be suctioned through the bottom surface so that air may flow through the filter 12 in the axial direction from a bottom, further increasing the filtering area. The filter 12 may optionally have a top surface. Alternatively, the filter 12 may be a cylindrical shell not having a bottom or top surface.

For convenience of description, the filter 12 will be described as a cylindrical shell shape having a bottom surface. A cylindrical body may correspond to a side surface of the filter 12, and a bottom surface may correspond to a lower surface of the filter 12.

The air purifier 1 may further include a filter frame 14 forming a mounting space in which the filter 12 may be mounted. The filter frame 14 may support an entire load of each component that performs an internal function of the air purifier 1 inside the first case 10.

The mounting space may be formed in a cylindrical shape corresponding to the shape of the filter 12. The filter 12 may be slidably inserted into and received in the mounting space during a mounting process, and may be slidably pulled and drawn out from the mounting space during a separating process. Details of a mounting and separating of the filter 12 may be similar to a process described in U.S. application Ser. No. 16/818,096 (Hl-1522), the entire contents of which are incorporated by reference herein.

A blowing or suction device or assembly may be provided inside the first case 10 to suction air. The blowing device may include the fan 16 and a fan housing 15. The fan 16 may be housed in the fan housing 15. The fan housing 15 may be provided at an outlet side of (i.e., above) the filter 12 and supported by the filter frame 14.

The fan 16 may provide a flow pressure of air through rotation. The fan 16 may be provided as a centrifugal fan to introduce air in the axial direction and discharge air upward and in the radial direction.

Filtered air discharged from the fan 16 may be discharged through the upper discharge portion 3 and the side discharge portion 4 in the power mode (where the air purifier 1 is lengthened) and may be discharged through the upper discharge portion 3 in the normal mode (where the air purifier 1 is shortened). The upper discharge portion 3 may be formed on top of the second case 20 so that the upper discharge portion 3 remains at a top of the air purifier 1 even when the second case 20 is lifted, while the discharge portion 4 may only be formed in the normal mode by the holes of the second case 20, which are provided above the holes of the first case 10 in the normal mode. (FIGS. 1 and 2).

Figure 4:
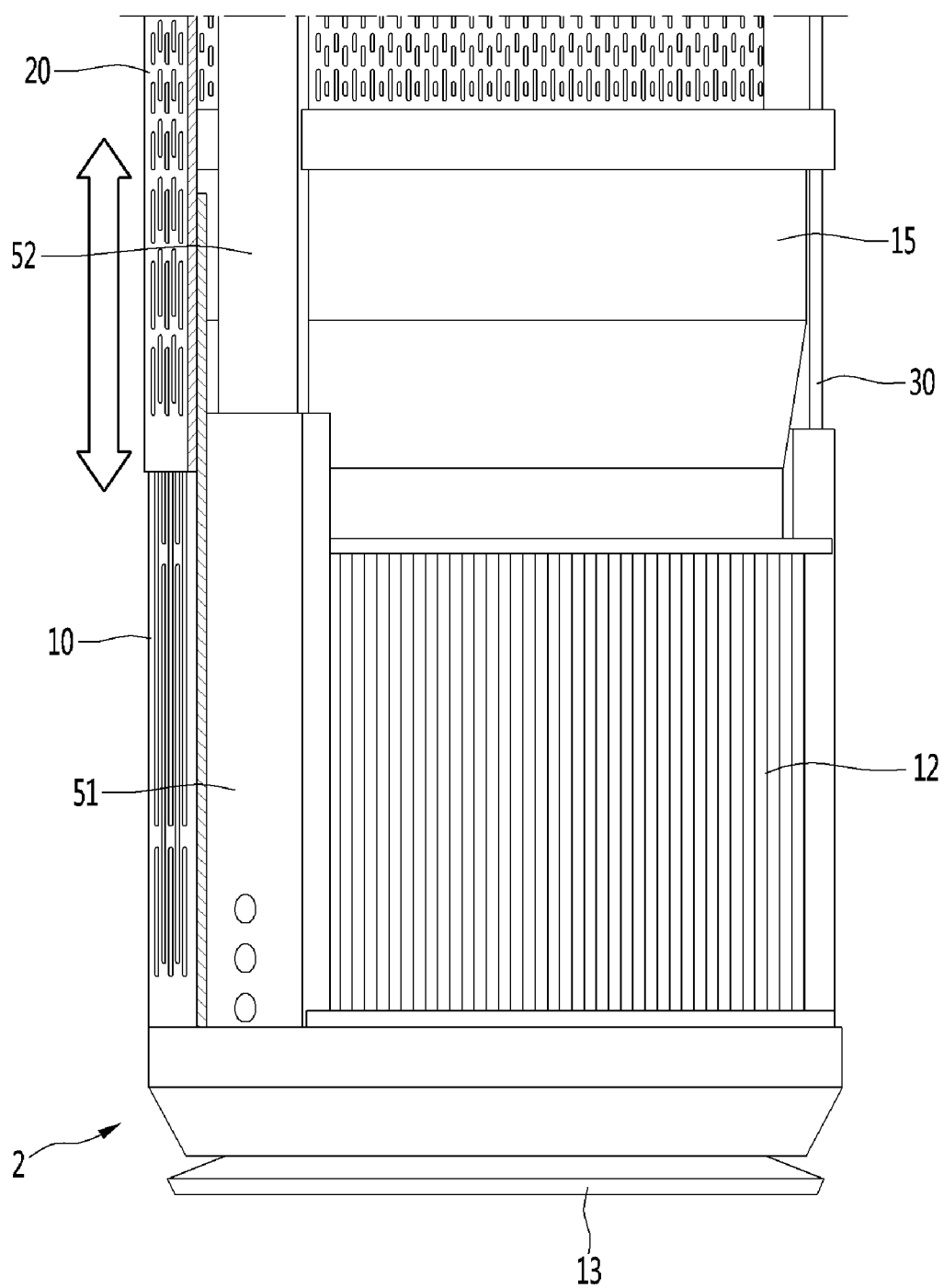
FIG. 4 is a front, cut view of an air purifier where a first case is partially cut.

Referring to FIG. 4, the first case 10 may remain in an initial or position, while the second case 20 may move up and down outside of the first case 10. Although FIG. 4 shows the filter 12, FIG. 4 shows a cut view of the first case 10, in such a state where the first case 10 remains in its initial position to be below the second case 20, the filter 12 may not be visible.

An LM guide (Linear Motion Guide) assembly may be provided to guide a sliding movement of the LM guide assembly may be fixed to internal components or devices such as the fan housing 15 and/or the filter frame 14. The LM Guide assembly may be formed integrally with one of the fan housing 15 or the filter frame 14, or may alternatively be formed separately and later combined. second case 20 with respect to the first case 10. The LM guide assembly may include a first LM guide 51 fixed to a side of the first case 10 and a second LM guide 52 fixed to a side of the second case 20. Via a sliding action of the first and second LM guides 51 and 52, the LM guide assembly may accurately guide upward and downward movement of the second case 20 to elongate or contract the vertical length of the air purifier 1.

The first LM guide 51 may be fixed to interior devices of the first case 10 such as the fan housing 15 and the filter frame 14 inside the air cleaning area 30 (FIGS. 2-3). The fan housing 15 and/or the filter frame 14 may be fixed directly or indirectly to the first case 10 and may not move with respect to the wall of the first case 10. The LM guide assembly, the filter frame 14, and the fan housing 15 may form a frame 30 that supports the air purifier 1 and maintains an exterior shape.

Figure 5:
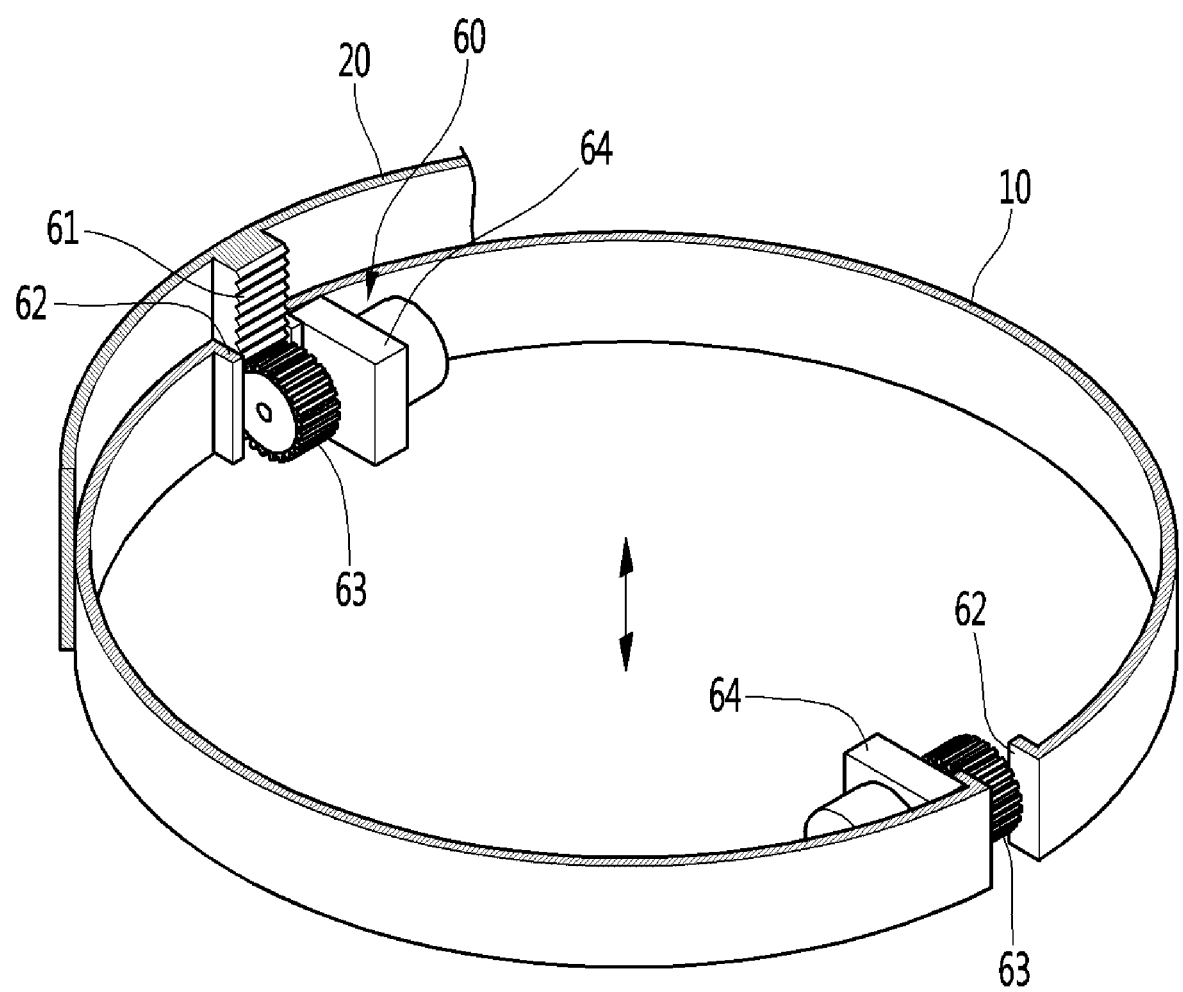
FIG. 5 is a view showing a lifting mechanism or linear motion guide of a second case.

Referring to FIG. 5, the second case 20 may move with respect to the first case 10 via a gear tooth method. The second case 20 may include a rack 61 formed of gear teeth or guide grooves. The first case 10 may include a pinion or gear 63 configured to engage with the rack 61 of the second case 20, and a drive motor 64 to drive or rotate the pinion 63 in a first or forward direction (e.g., clockwise) and a second or reverse direction opposite to the first direction (e.g., counterclockwise). The pinion 63 and the rack 61 may be interlocked with each other by the forward or reverse rotation of the drive motor 64 so that the second case may ascend and descend. The pinion 63 may be formed on an upper inner portion of the first case 10 and the rack 61 may be formed on a lower inner portion of the second case 20 at positions where the first and second cases 10 and 20 overlap.

The first case 10 may include a rack guide member 62, which may be an opening configured to fit around sides or edges of the rack 61 of the second case 20. The pinion 63 may be provided between sides of the rack guide member 62 to couple to the rack 61.

The second case 20 may include two racks 61, one formed at a first side and another formed at a second side opposite the first side. The first case 10 may include two pinions 63 to correspond to each rack 61 of the second case 20 and two drive motors 64 to drive the two pinions. The first case may have two drive motors 64 installed in the first case 10 to drive the two pinions 63 in the normal direction and the reverse direction, respectively.

The two drive motors 64 may be decelerated and rotated through a built-in reduction gear 60. The reduction gear 60 may solve problems arising when a rotational speed of the drive motor 64 is high while a rotational torque of the drive motor 64 is low.

Embodiments disclosed herein are not limited to two sets of racks 61, gears 63, drive motors 64, etc. As an example, there may be three or more racks 61 spaced apart by equal intervals along the circumferential direction of the second case 20. The larger the diameter of the first and second cases 10 and 20 are, or the smaller the size and power of the driving motor 64, the more sets of racks 61 and gears 63 may be provided to support a weight and maintain stability of the second case 20 during lifting.

Lifting mechanisms of the first and second case 10 and 20 are not limited to rack and pinion or geartooth methods, and may have various other configurations. For example, a plunger type driving mechanism using hydraulic pressure and/or pneumatic or air pressure may be applied, especially in cases where a weight of the second case 20 may be large. A solenoid may also be applied.

Figure 6:
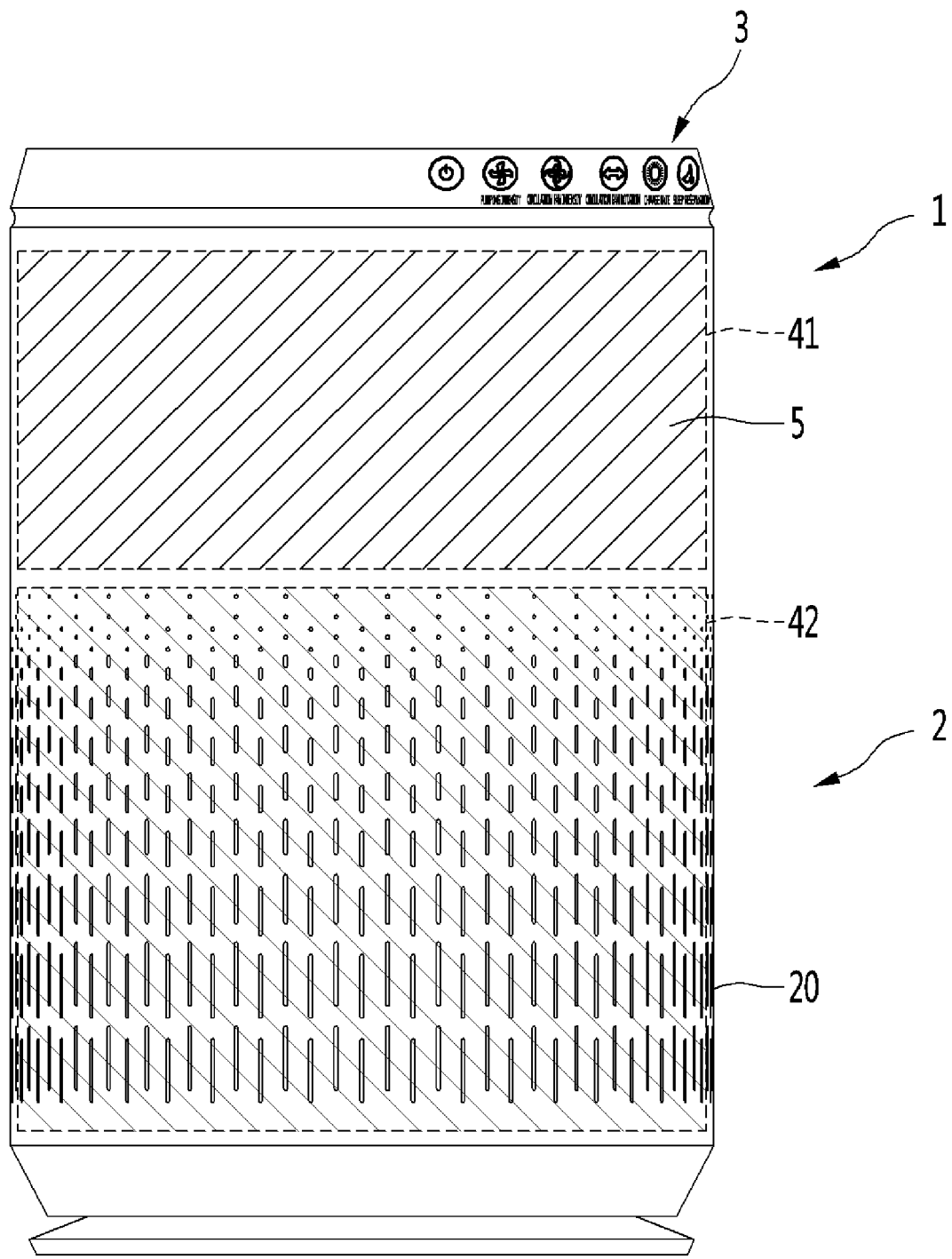
FIG. 6 is a view showing an operation state of a normal mode.
Figure 7:
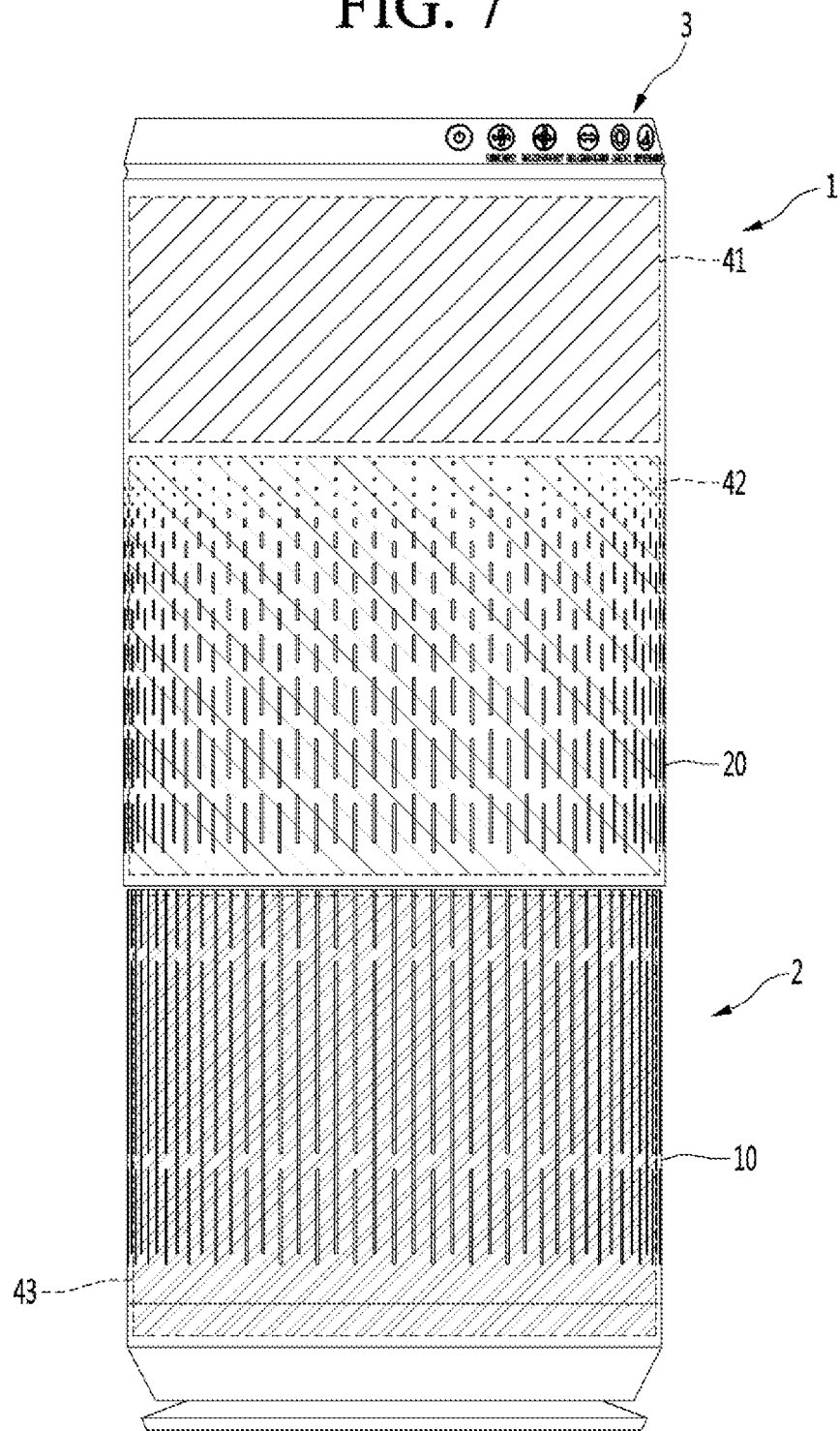
FIG. 7 is a view showing an operation state of a power mode.

Referring to FIGS. 6 and 7, the first case 10 may have a first hole region or area 43 on the lower side portion 28 (FIG. 3). The first hole region 43 may include a plurality of elongated holes or slits formed in the wall of the first case 10 and extending in the vertical direction. The holes in the first hole region 43 may be provided in primarily two forms: a first form having a first length and a second form having a second length shorter than a first length. Air passing through the suction portion 2 may be introduced into an interior of the air purifier 1 through the first hole region 43.

The second case 20 may have a second hole region 42 and a non-porous or solid region 41. The second hole region 42 may be provided in a lower portion or section of the second case 20, while the non-porous or solid region 41 may be provided in an upper portion or section of the second case 20.

The second hole region 42 may include a plurality of elongated holes or slits formed in the wall of the second case 20 and extending in the vertical direction. The holes in the second hole region 42 may come in a variety of forms having a variety of lengths. Holes provided in a lower portion of the second hole region 42 may have longer lengths than holes provided in an upper portion of the second hole region 42. Lengths of the holes of the second hole region 42 may gradually decrease in an upward direction.

Various opening and closing structures to open and close the top and side of the upper discharge portion 3 may be provided in an interior of the second case 20 in the non-porous region 41. An internal structure of the air purifier 1 may be configured to be compact and efficient, as the blowing device may be provided inside the first case 10 and structures to open and close the upper discharge portion 3 may be provided inside the second case 20 at or within the non-porous region 41. Details of an opening and closing of the upper discharge portion 3 will be described later with reference to FIGS. 9 and 10.

The non-porous region 41, the first hole region 43, and the second hole region 42 may be predetermined regions and are indicated by dotted lines in FIG. 7. In the normal mode, the first hole region 43 of the first case 10 and the second hole region 42 of the second case 20 may overlap to form the suction portion 2, and the second hole region 42 may partially obstruct a suction of air. In the power mode, the second hole region 42 of the second case 20 may become the side portion discharge portion 4, and suction of air may be unobstructed.

An aperture ratio of the second hole region 42 and the first hole region 43 may be predetermined based on sizes of the holes in the first hole region 43 and sizes of the holes in the second hole region 42. As an example, an average size of the holes in the second hole region 42 may be smaller than an average size of the holes in the first hole region. Alternatively or in addition thereto, the first hole region 43 may have a first opening ratio (a size of the largest hole in the first hole region 43 compared to a size of the smallest hole in the first hole region 32), and the second hole region 42 may have a second opening ratio (a size of the largest hole of the second hole region 42 compared to a size of the smallest hole of the second hole region 42). The first opening ratio may be larger than the second opening ratio.

The first hole region 43 may have a first total opening ratio, which is a ratio of a total combined area of the holes of the first hole region 43 compared to a total surface area of the wall of the first case 10. The second hole region 42 may have a second total opening ratio, which is a ratio of a total combined area of the holes of the second hole region 42 compared to a total surface area of the wall of the second case 20. The larger the first and second average opening ratios, the smaller the flow resistance of air. The smaller the first and second total opening ratios, the larger the flow resistance of air. The first and second total opening rations may be adjusted by adjusting a number of holes or a size of each of the holes.

Since an average size of the holes in the first hole region 43 may be larger than an average size of the holes in the second hole region 42, suction efficiency of the suction portion 2 may be increased when the second case 20 is lifted and the air purifier 1 is operated in the power mode. Discharge efficiency may be decreased when the second case 20 is lowered and the air purifier 1 is operated in the normal mode, as air may be discharged primarily through the upper discharge portion 3, and the side discharge portion 4 may not be formed because the second hole region 42 is part of the suction portion 2. The aperture ratios, first and second opening ratios, and/or first and second total opening ratios of the first and second hole regions 43 and 42 may be varied based on performance and other requirements desired of the air purifier 1.

In the normal mode when the second case 20 is moved downward, the first hole region 43 and the second hole region 42 may overlap each other to provide the suction portion 2, increasing the flow path resistance. The side discharge portion 4 may not be operated, and clean or filtered air may be discharged through the upper discharge portion 3. In the power mode when the second case 20 is lifted upward, the second hole region 42 may function as the side discharge portion 4, and may not overlap with the first hole region 43. The suction portion 2 may be formed by the first hole region 43 and the bottom suction portion 27 (FIG. 3).

The air purifier 1 may also be operated at a state in between the normal mode and power mode. The second case 20 may be lifted upward but not by a maximum amount. In such a situation, the second hole region 42 may partially overlap with the first hole region 43, and a non-overlapping portion of the second hole region 42 may serve as the side discharge portion 4 and an overlapping portion of the second hole region 42 may form the suction portion 2 with the first hole region 43. A height of the second case 20 may be adjusted based on a desired performance by the user. As a height of the second case 20 is increased, suctioning and discharging efficiency may also be increased. The power mode may suction more air, purify more air, and discharge more filtered air as compared with the normal mode.

Figure 8:
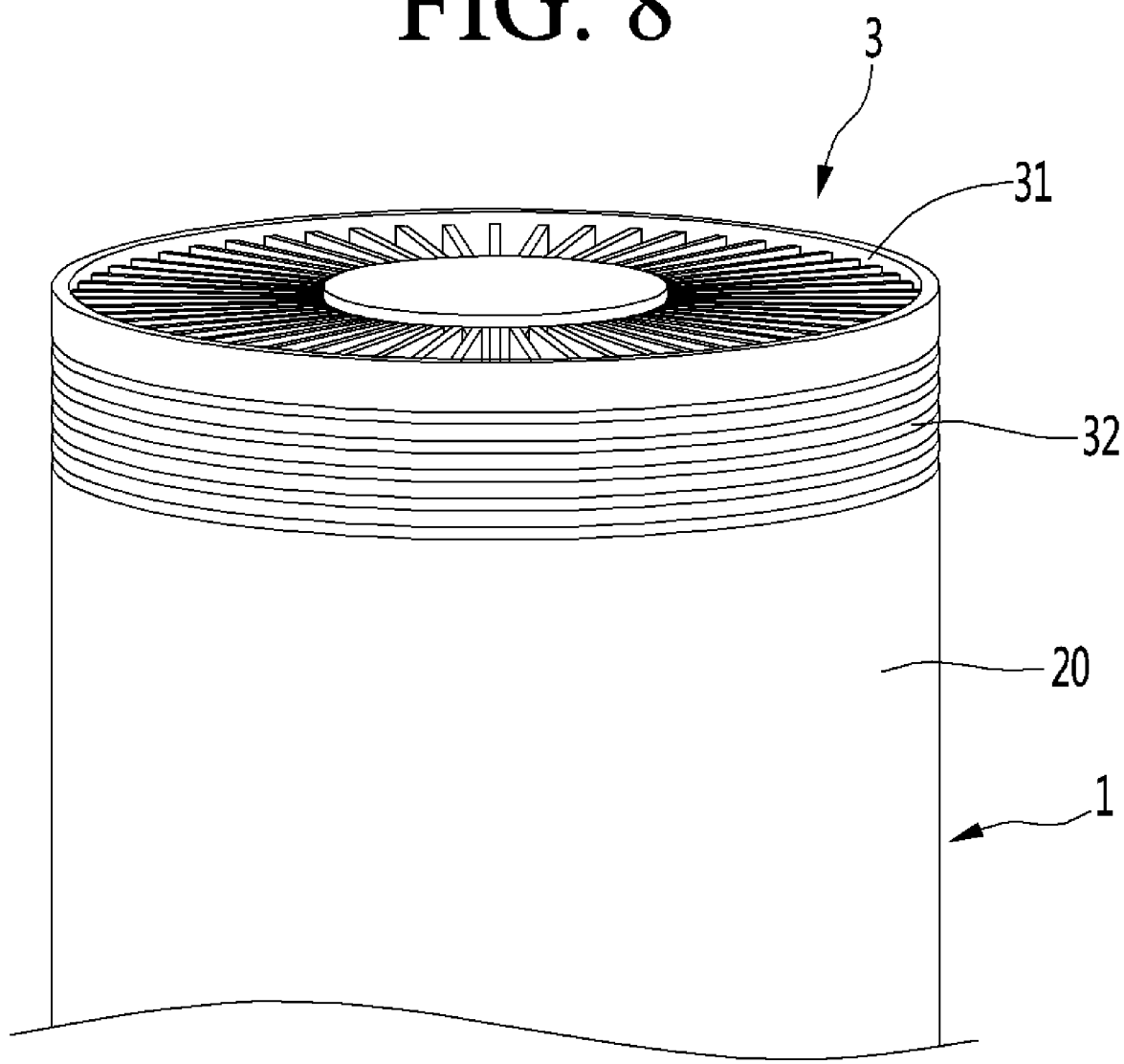
FIG. 8 is a view explaining an action of the upper discharging portion of the air purifier according to an embodiment.

Referring to FIG. 8, the upper discharge portion 3 may be provided with a top discharge portion or grill 31 and a side discharge portion or grill 32. The top discharge grill 31 may be provided on an upper surface of the air purifier 1 and discharge clean air upward. The side discharge grill 32 may be provided on a circumferential or side of the air purifier 1. The discharge portion 3 may be provided at an upper end of the non-discharge region 41 (FIG. 7) of the second case 20. The side discharge grill 32 may increase a lateral flow velocity of clean air discharged from the upper discharge portion 3.

The top discharge grill 31 may be formed as a grill. The side discharge grill 32 may have a grill or slit structure. As an example, the side discharge grill 32 may be formed by a plurality of slits extending along the circumferential direction to form a ring shape. The rings may be spaced apart in the axial direction. The second case 20 may have ribs of flanges extending through the rings to support portions of the case 20 provided between the rings of the side discharge grill 32. Each of the side discharge grill 31 and the top discharge grill 32 may have a plurality of ribs capable of guiding a flow direction of the clean air.

The top discharge grill 31 and the side discharge grill 32 may be opened and closed separately from each other. Accordingly, at least one of the top discharge grill 31 and the side discharge grill 32 may be selected to discharge clean air provided from the fan 16. Various operating modes of the air purifier 1 may be implemented by various adjustments of the top and side discharge grills 31 and 32 to adjust a flow of discharged air, improving satisfaction by allowing customization through a variety of discharge modes.

Figure 9:
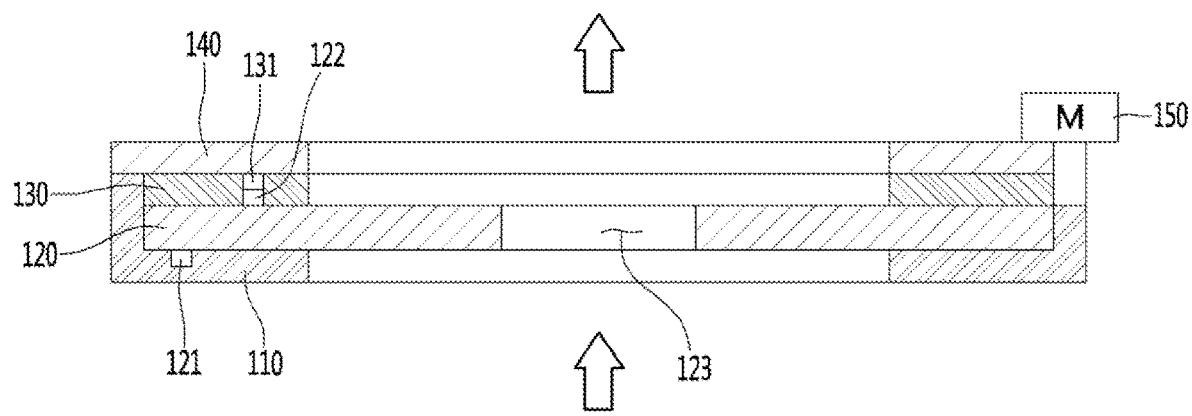
FIG. 9 is a cross-sectional view of an opening and closing structure a top discharge portion or grill.
Figure 10:
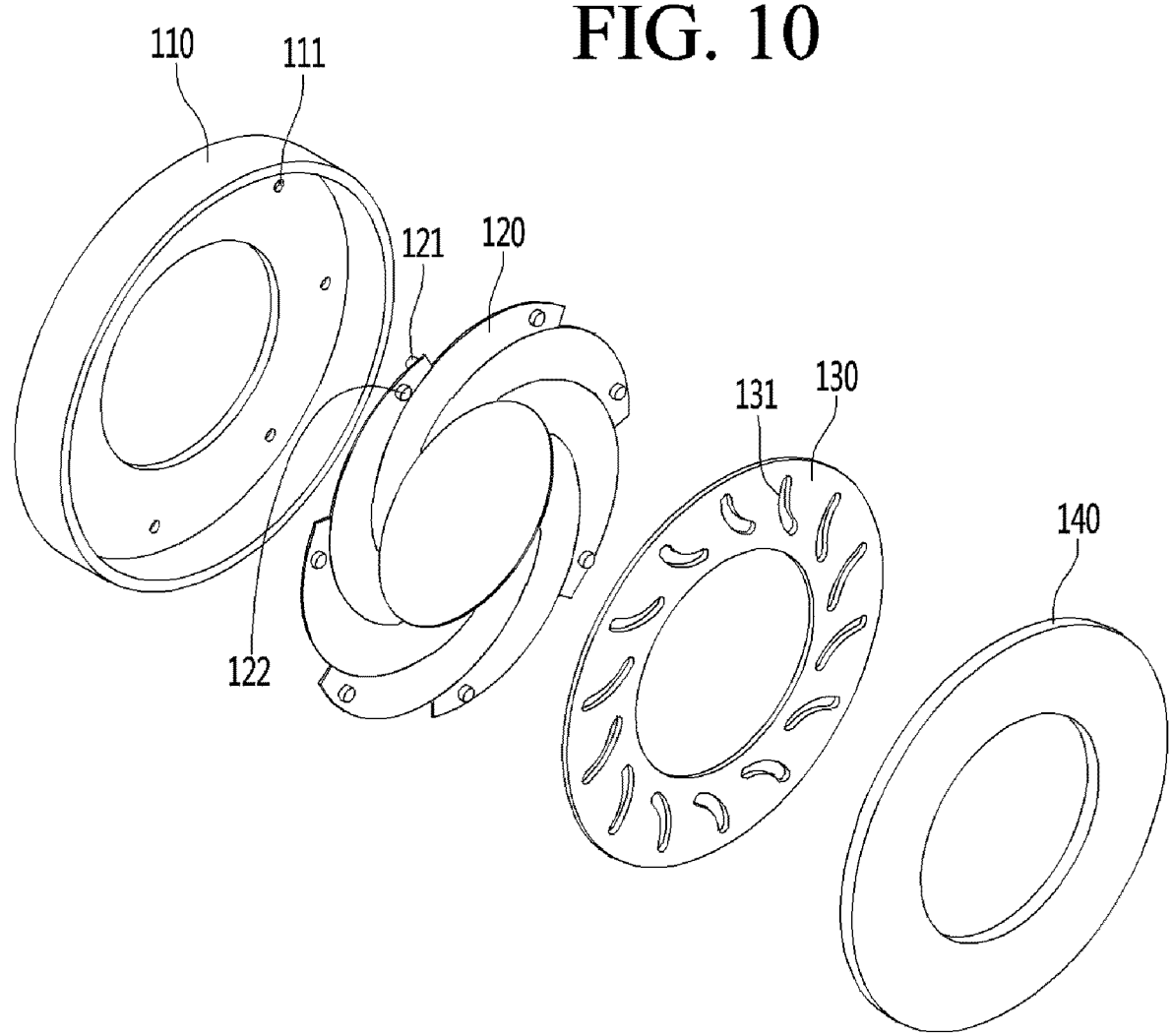
FIG. 10 is an exploded perspective view of the opening and closing structure of FIG. 9.

Referring to FIGS. 9 and 10, an opening and closing structure to open and close the top discharge grill 31 may be provided horizontally within an upper portion of the second case 20. A central opening 123 may be formed in a middle of the opening and closing structure. The clean air discharged from the fan 16 may be blown upward through the central opening 123 to be discharged out the top discharge grill 31.

The opening and closing structure for the top discharge grill 31 may include a lower cover or case 110 provided on a lower side and an upper cover or lid 140 provided on an upper side. The lower and upper covers 110 and 140 may provide a receiving space. A wing device 120 and a driving plate 130 may be provided in the receiving space. The wing device 120 may have a plurality of variable wings. At least one motor 150 may be provided to rotate the driving plate 130. A driving shaft of the motor 150 may couple to an outer circumferential surface of the driving plate 130 so that the driving plate 130 is rotated by the motor 150.

The opening and closing structure of the top discharge grill 31, along with the LM guide assembly, may be provided at positions that do not interfere with the side discharge grill 32, the side discharge portion 4, or any other openings so that air is properly suctioned and discharged without obstruction through the suction portion 2, the upper discharge portion 3, and the intermediate discharge portion 4, and also so that suctioned or discharged air does not accidentally affect the opening and closing structures or the LM guide assembly. The second case 20 may have an internal case or frame in which the opening and closing structures of the top discharge grill 31 and side discharge grill 31 and components of the LM Guide assembly may be provided and protected so that the fan housing 15, fan 16, filter frame 14, and any other devices provided in the first case 10 do not accidentally interfere with the opening and closing structures and the LM Guide assembly provided within the second case 20.

The wing device 120 may expand and contract to open and close the central opening 123. The wing device 120 may operate similarly to a camera shutter device, and the wing device 120 may alternatively be referred to as a shutter, while the central opening 123 may alternatively be referred to as an aperture. FIG. 10 shows an expanded state of the wing device 120. In the expanded state, wings of the wing device 120 may be expanded outward to align next to each other, and inner ends may form a circular opening. In a contracted state, the wings of the wing device 120 may overlap with each other, and inner ends may move closer to each other to close the circular opening and obstruct the central opening 123.

Rotary shafts 121 and 122 may be coupled to outer ends of the wings of the wing device 120. Rotary shafts 121 may be lower shafts coupled to a lower side of the wing device 120, while rotary shafts 122 may be upper shafts coupled to an upper side of the wing device 120. The lower shafts 121 may be fixed to the lower cover 110. The lower cover 110 may include holes 111 in which the lower shafts 121. A bottom section of the wing device 120 may remain fixed via the lower shafts 121, while an upper section of the wing device 120 may open and close via rotation or pivoting of the upper shafts 122.

The upper shafts 122 may be rotated or pivoted by the driving plate 130. Each wing, which may have an upper shaft 122, may be rotated or pivoted by a same angle and move by a same distance during expansion and contraction based on positions of the upper shafts 122 and a formation of the driving plate 130.

The driving plate 130 may have a plurality of guide slots 131 formed to correspond to the plurality of upper shafts 122. The guide slot 131 may slide with respect to the upper shaft 122, and a direction and movement of the guide slot 131 with respect to the upper shaft 122 may be restricted by a size and shape of the guide slot 131. The guide slot 131 may have a smooth curvature toward a center of the driving plate 130. When the driving plate 130 rotates, the upper shaft 122 may ultimately be restricted by an inner or outer end the guide slot 131 and be pulled or pushed. The movement of the upper shaft 122 may lead to expansion and contraction of the wing device 120.

The driving plate 130 may be rotated by power provided by the motor 150. When the driving plate 130 rotates, the guide slot 131 may rotate, and the guide slots 131 may move to pull or push the upper shafts 122 to move inward toward or outward away from the center of the driving plate 130 to open and close the central opening 123. The upper shaft 122 may slide on an inner surface of the guide slot 131.

The movement of the upper shaft 122 in and out may be followed by an operation of expanding and contracting the wing device 120 in and out. Each of the wings of the wing device 120 may have an upper section, which moves in and out with respect to a bottom section, which may be fixed by the lower shaft 121. The movement of the wings leads to overlapping so that a size of the central opening 123 may be increased or decreased.

A size of the central opening 123 may determine an amount of air discharged through the top discharge grill 31. The holes 123 pass through the center of the lower cover 110, the variable wing 120, the driving plate 130, and the upper cover 140. A diameter of the central opening 123 may be reduced or enlarged by overlapping two or more of the wings of the wing device 120. As the diameter of the opening 123 is increased, an amount of clean air discharged may also be increased. As the diameter of the opening 123 is decreased, an amount of clean air discharged may also be decreased.

The size of the central opening 123 may therefore be enlarged or reduced via the motor 150 by a forward rotation or a reverse rotation of the driving plate 130 to increase or decrease an amount of discharged air. The top discharge grill 31 may be completely closed, completely opened, or partially opened based on an adjustment of the size of the central opening 123.

Figure 11:
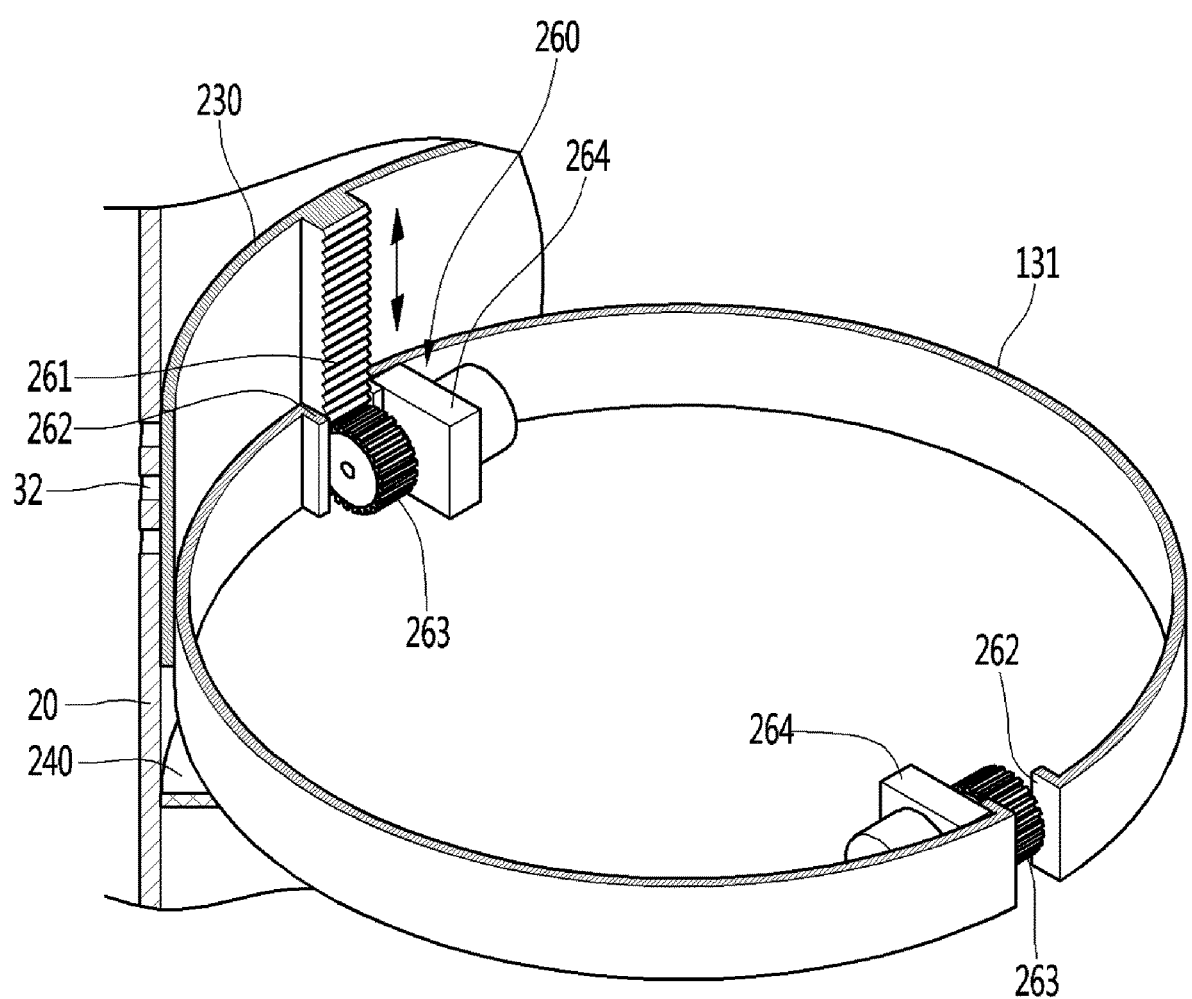
FIG. 11 is a perspective view of an opening and closing structure of a side discharge portion or grill.

Referring to FIG. 11, the side discharge grill 31 may be opened and closed via a vertical movement of a door 230. The door 230 may be a wall provided inside of the second case 20. To close the side discharge grill 31, the door 230 may be moved to a position overlapping with the holes of the side discharge grill 31 to obstruct an air flow out of the side discharge grill 31. To open the side discharge grill 31, the door 230 may be moved to a position (i.e., above or below) that does not overlap with the holes of the side discharge grill 31 so that air may flow out of the side discharge grill 31 unobstructed.

As exemplified in FIG. 11, the door 230 may overlap with the side discharge grill 31 to close the side discharge grill 31. The side discharge grill 31 may be opened by lowering the door 230. Alternatively, side discharge grill 31 may be opened by raising the door 230. The door 230 may be raised and lowered by a rack and pinion and/or gear tooth method, similar to the method of raising and lowering the second case 20 with respect to the first case 10 shown in FIG. 5. However, embodiments disclosed are not limited hereto. For example, a plunger type driving mechanism using hydraulic pressure and/or pneumatic pressure may be applied, especially when a load on the door 230 and any member attached thereto is large. When it is necessary to open and close the door 230 quickly, a mechanism such as a solenoid may be used. The door 230 and a structure to raise and lower the door 230 may be located inside of the second case 20 at the non-porous region 41 and extend above the non-pours region 41 to overlap with the discharge portion 3.

FIG. 11 exemplifies a rack and pinion method. A motor support portion or frame 131 may be fastened to the second case 20 via a flange or pedestal 240. The frame 131 may have a ring or cylindrical shell shape, and the flange 240 may extend radially outward to fix to an inner surface of the second case 20. An inner side of the door 230 facing the motor support frame 131 may include a rack 261. The door 230 may also be formed in a cylindrical shell shape so as to cover the rings of the side discharge grill 32, and the door 230 may include a plurality of racks 261 spaced apart along the circumferential direction on the inner surface of the door 230. The motor support frame 131 may include at least one pinion 263 to correspond to the rack 261 and at least one motor 264 to rotate the pinion 263 in a forward or first direction and a reverse or second direction opposite to the first direction. As exemplified in FIG. 11, the door 230 may include two racks 261 at opposite sides, and the motor support frame may include two pinions 263 rotated by two motors 264, respectively. When the two pinions 263 are at opposite sides, they may rotate in opposite directions to lift and lower the door 230. Alternatively, there may be three or more racks 261 may be provided at three or more positions along a circumferential direction of the door 230.

The pinion 263 and the rack 261 may be interlocked with each other by teeth or guide grooves. When the door 230 is raised, the side discharge grill 32 may be closed. When the door 230 is lowered, the side discharge grill 32 may be opened. The two drive motors 264 may be capable of decelerating rotation through a built-in reduction gear 260 to improve a driving action in the event of low torque and high rotation speed.

Figure 12:
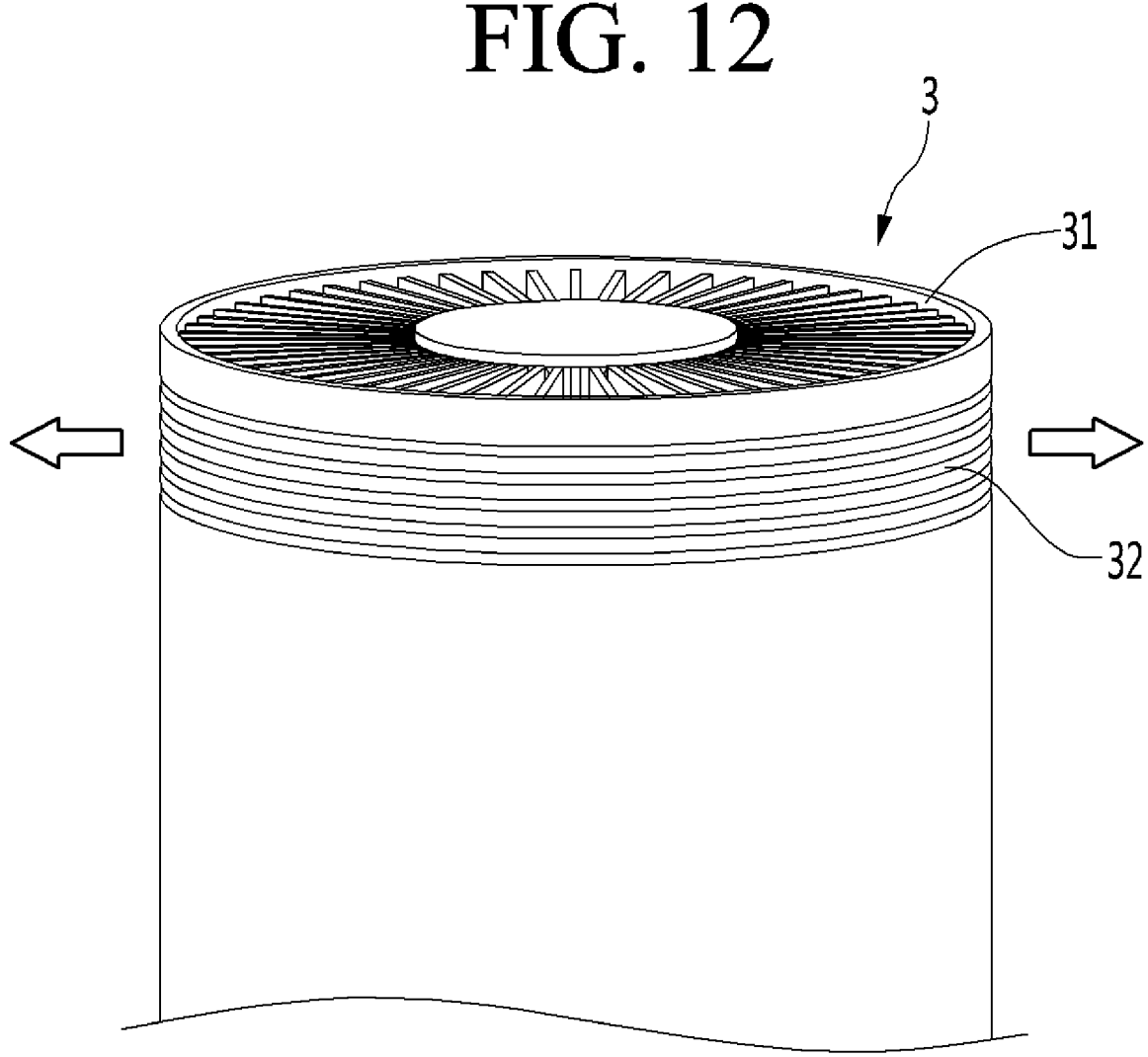
FIG. 12 shows a state in which only the top discharge portion is opened.

Referring to FIG. 12, the top discharge grill 31 may be closed while the side discharge grill 32 may be opened. Purified air may be discharged laterally from the side discharge grill 32 at a high flow rate through a relatively small discharge area, and may directly affect adjacent users. Such air flow discharged through the side discharge grill 32 may be referred to as direct air flow.

Figure 13:
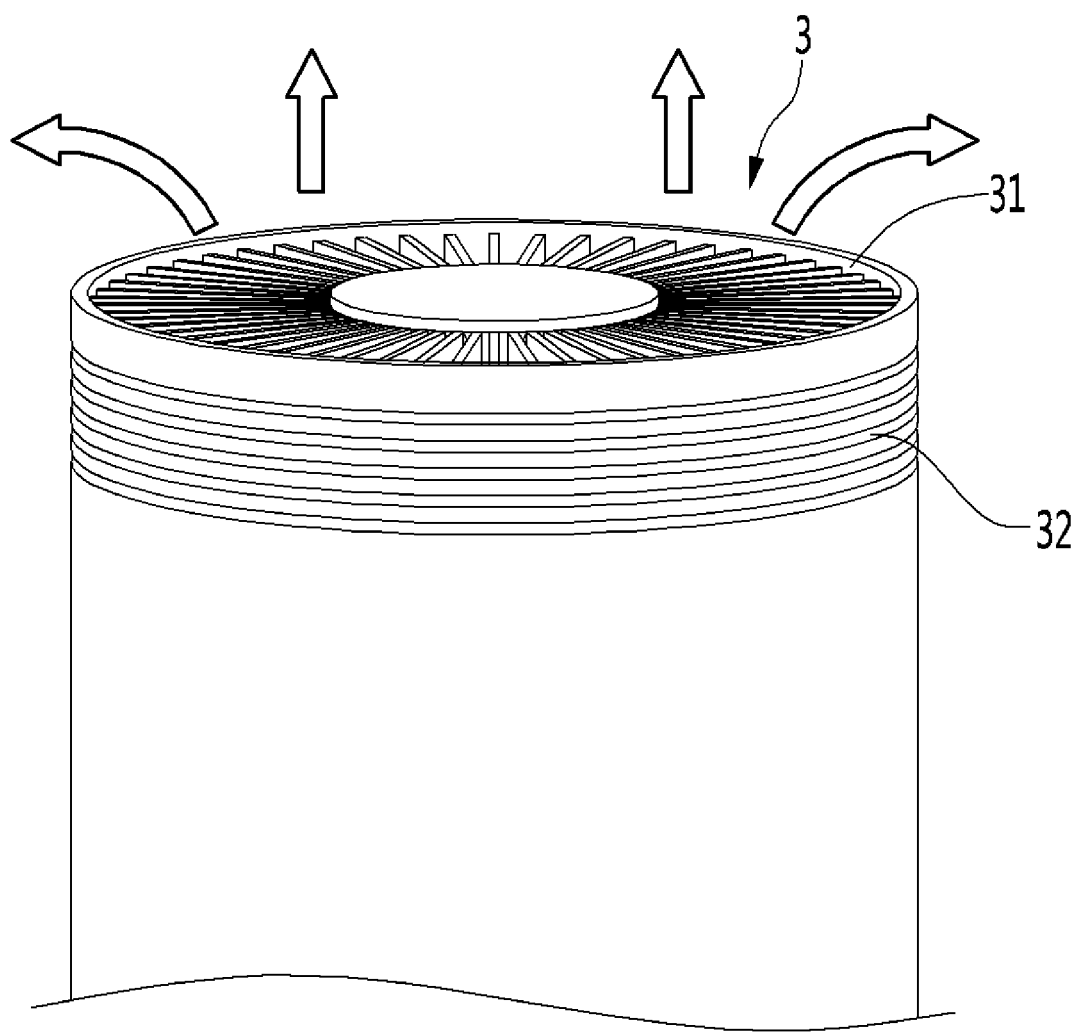
FIG. 13 shows a state in which only the side discharge portion is opened.

Referring to FIG. 13, the top discharge grill 31 may be opened while the side discharge grill 32 may be closed. Purified air may be discharged upward through the top discharge grill 31 toward a ceiling and fall back downward or be redirected back downward after colliding with the ceiling or another object, and may be dispersed before reaching any users. Such air flow discharged through the top discharge grill 31 may be referred to as indirect air flow.

The user may control an amount of direct and indirect air flow by adjusting an opening and closing of both the top and side discharge grills 31 and 32. For example, if the user desires more direct air flow and less indirect air flow, the user may open the side discharge grill 32 and close the top discharge grill 31. If the user desires less direct air flow and more indirect air flow, the user may close the side discharge grill 32 and open the top discharge grill 31.

Figure 14:
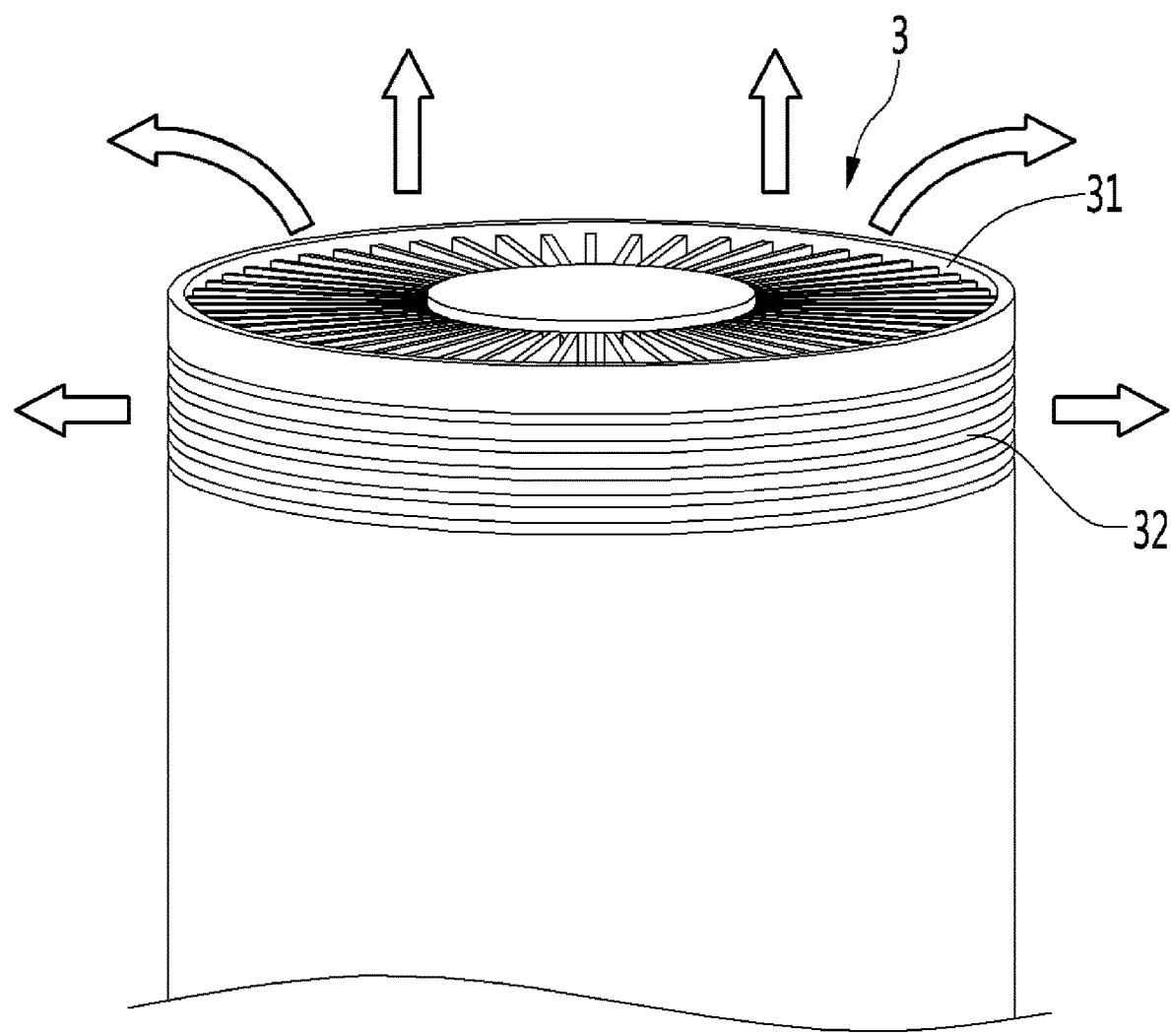
FIG. 14 is a view showing a state in which both the top discharge portion and the side discharge portion are opened.

Referring to FIG. 14, both the top and side discharge grills 31 and 32 are opened, and both indirect and direct air flow may be discharged. In addition, based on a height adjustment of the second case 20, air may also be discharged through the side discharge portion 4 (FIG. 1). A height of the second case 20 may be adjusted to control an air flow. In the power mode, clean air discharged from the side discharge grill 32 may flow toward a head of an adjacent user, and clean air discharged from the side discharge portion 4 may flow toward a trunk of an adjacent adult or a head of an adjacent child. In such a situation, the air discharged from the side discharge grill 32 may be direct upper air flow while air discharged from the side discharge portion 4 may be direct lower or middle air flow. In the normal mode, clean air discharged from the side discharge grill 32 may flow toward a trunk of an adjacent adult or a head of an adjacent child, and may be direct lower or middle air flow. In the power mode and the normal mode, the top discharge grill 31 may indirectly blow clean air to an entire space of the room.

Table 1 summarizes discharging or use modes of the air purifier 1 which may be implemented in the normal mode and the power mode by the top discharge grill 31, the side discharge grill 32, and the side discharge portion 4.

TABLE 1

| | Top discharge grill 31 | Side discharge grill 32 | Side discharge portion 4 | Air Flow |
|---|---|---|---|---|
| Normal mode | Open | Closed | Closed | Indirect air flow |
| Normal mode | Open | Open | Closed | Indirect air flow/ Direct air flow toward an adult trunk or child head |
| Normal mode | Closed | Opened | Closed | Direct air flow toward an adult trunk or child head |
| Power mode | Opened | Opened | Opened | Indirect air flow/ Direct air flow toward an adult trunk, child head, and adult head |
| Power mode | Opened | Closed | Opened | Indirect air flow/ Direct air flow toward an adult trunk or child head |
| Power mode | Closed | Opened | Opened | Direct air flow toward an adult trunk, child head, and adult head |
| Power mode | Closed | Closed | Opened | Direct air flow toward an adult trunk and child head |

Referring to Table 1, seven modes may be implemented in the normal mode or power mode. In addition, more modes may be implemented when the second case 20 is at various heights between an initial height in the normal mode or a maximum height in the power mode. As a height of the second case 20 increases, direct air flow from the side discharge portion 4 may decrease.

Dimensions of the air purifier (positions of the side discharge portion 4 and side discharge grill 32, a number of holes or a assize of holes of the side discharge portion 4, side discharge grill 32, and top discharge grill 31, etc.) may be sufficiently utilized so that a cleaning function of the air purifier 1 may address a whole area of a room or optional areas. Referring to Table 1, air in a middle height region of a room may be purified in the normal mode via the top discharge grill 31. In the power mode, more air may be suctioned and purified, and air in both middle and upper regions of the room may be purified. A user may switch between modes based on a preference, increasing satisfaction. Alternatively or in addition thereto, the air purifier 1 may include an optional air quality sensor or communicate with remote air quality sensors, and an operation of the air purifier 1 may be based on sensed air quality. For example, an opening and closing of the top discharge grill 31, an opening and closing of the side discharge grill 32, and a height of the second case 20 (and therefore a size of the side discharge portion 4) may be adjusted based on sensed air quality in an upper portion or lower portion of the room.

The side discharge portion 4 and the side discharge grill 32 may have similar heights but different functions based on sizes and shapes of their holes or openings. For example, the side discharge portion 4 may include a plurality of wider holes to create a larger or wider discharge area as compared with the side discharge grill 32, which may be thinner slits. A flow rate of air discharged through the side discharge portion 4 may be smaller or slower than a flow rate of air discharged through the side discharge grill 32. Air discharged through the side discharge portion 4 may be more indirect and disperse more than air discharged through the side discharge grill 32. The side discharge portion 4 may, for example, be used for elderly adults who might find direct air flow bothersome, and the side discharge grill 32 may be used for adults who want direct air.

A separate door similar to door 230 (FIG. 11) may be optionally provided to open and close the side discharge portion 4. When the separate door for the side discharge portion 4 is provided, more discharging modes may be implemented, as the side discharge portion 4 maybe closed in the power mode. As another alternative, the door 230 may be provided to open and close the side discharge portion 4 instead of the side discharge grill 32. In this case, an air cleaning function for a middle area of the room may be performed in the normal mode via the side discharge grill 3 and in the power mode via the side discharge portion 4. Air cleaning of middle and upper regions may be simultaneously performed in the power mode when both the upper discharge portion 3 and the side discharge portion 4 are opened.

The first case 10 may also be moveable in the first direction for easy replacement of the filter 12. The LM Guide assembly may include an additional LM Guide to move the first case 10 relative to the filter frame 14 and/or the fan housing 15. Details of such an embodiment are disclosed in U.S. application Ser. No. 16/815,506 filed on Mar. 11, 2020, the entire contents of which are hereby incorporated by reference.

This application is related to co-pending U.S. application Ser. No. 16/815,506 filed on Mar. 11, 2020 and Ser. No. 16/815,573 filed on Mar. 11, 2020, the entire contents of which are hereby incorporated by reference.

Embodiments disclosed herein may provide an air cleaner or purifier which may sufficiently utilize a given specification or mode of the air cleaner to quickly purify indoor air. The air purifier may be capable of using both upper and lower portions as a discharging structure at the same time.

The air cleaner may supply clean air simultaneously to an entire area of an indoor space where the air cleaner is placed, and may address various needs of various users. The air cleaner may be capable discharging direct or indirect air at various heights in accordance with a user's preferences, increasing satisfaction.

Embodiments disclosed herein may be implemented as an air cleaner or purifier including a first case having a wall to accommodate at least a part of a fan and a filter, the first case extending in the vertical (i.e., the up and down) direction, a second case movable in the up and down direction so as to be able to receive at least a part of the fan and the filter and at least partly overlap with the wall of the first case, a discharge portion provided on an upper portion of the second case, and a suction portion provided in the first case. The air cleaner may be operated by moving the second case based on a mode selected by the user.

The air cleaner may include a lower suction portion through which outside or ambient air is sucked or suctioned through the wall of the first case and a base which may be spaced apart from a lower side of the first case. A base suction part or portion may be provided at an interval between the first case and the base. A large amount of air may be suctioned through the base suction portion and the lower suction portion.

The discharge portion may include an intermediate discharge portion provided at a lower portion of the second case so that a large amount of clean air may be supplied when the user desires such clean air. Since the intermediate discharging portion may overlap with at least a part of the lower suction portion, an amount of suctioned air may be adjusted.

The discharging portion may include an upper discharge portion provided on an upper portion of the second case so that a height at which clean air is discharged may be adjusted in accordance with a user's needs. The upper discharge portion may include an upper or top discharge portion or grill provided on a top upper surface of the second case and to discharge clean air upward when the user desires. The upper discharge portion may also include an upper side discharge portion or a side discharge grill provided on an upper side surface of the second case to discharge clean air laterally or sideways when the user desires. At least one of the upper side discharge portion and the top discharge portion may be opened and closed so that the user may concentrate discharged air in a desired direction.

An LM guide may connect the first case and the second case to each other so that an overlapping action of the first and second cases may be stably performed. The upper part of the second case may include a non-hollow area without a hole so that the devices or components may be accommodated in the non-hollow area and interference may be prevented when the second case is lifted or lowered.

The first case and the second case may be provided in a cylindrical shape or cylindrical shell shape so as not to interfere with a flow of air. The first case and the second case may share a geometric center, and the air cleaner may be elongated and contracted so that a height of the air cleaner may be freely adjusted.

Embodiments disclosed herein may be implemented as an air cleaner or purifier including a first case having a cylindrical shape extending in a vertical direction, a filter accommodated in the first case to filter outside or ambient air, a fan positioned above the filter to provide a negative pressure, and a cylindrical second case which may be moved up and down along a wall of the first case. The height at which clean air is discharged may be adjusted by the user.

The wall of the first case may have a first hole region provided with a plurality of holes, and a large amount of outside air may be introduced through the first case. The wall of the second case may have a second hole region provided with a plurality of holes at a lower portion of the wall so that the amount of suctioned outside air may be adjusted through a suction portion.

The second case may have an upper or top discharge portion or grill to discharge clean air upward from an upper surface so that an indirect flow of clean air may be supplied when desired. The second case may also have an upper side discharge portion or grill to discharge clean air laterally from an upper side so that a more direct flow of clean air may be supplied when desired.

At least one of the top discharge portion or the side discharge portion may have an opening and closing structure to open and close the discharge portion so that clean air may be supplied to any one of the discharge portions.

The top discharge portion may have an opening and closing structure that includes a cover horizontally provided within an inner surface of the second case, a wing device having at least two variable vanes housed in an inner space of the cover, and a drive plate to guide a pivot of the wing device about an axis to rotate or pivot the at least two variable vanes so that a size of the top discharge portion may be adjusted. An opening degree of the discharge portion may be adjusted to a desired degree by the user.

The upper side discharge portion may have an opening and closing structure that includes a door that raises and lowers via a rack and pinion method. A rack may be provided on an inner side or surface of the door, a motor support portion may be fixed to the second case, and a motor may be fixed to the motor support portion. The motor may drive a pinion that meshes or engages with the rack. The motor may drive the pinion to lift and lower the door so that an air volume and flow speed of clean air may be adjusted. The opening and closing structures may be placed in a non-air-tight region where air does not pass over the upper portion of the second case so that a flow of air may be controlled without interfering with an air cleaning action.

Embodiments disclosed herein may be implemented as an air cleaner or purifier including a first case having a wall to accommodate or cover at least a part of a fan and a filter, the wall extending in a first direction, a second case capable of receiving or covering at least a part of the fan and the filter and being movable in the first direction, a discharge part or portion provided on one side of the second case, and a suction portion provided in the first case. Another side of the second case may be aligned with an inside and/or outside of the first case. Accordingly, a size of the air cleaner may be adjusted so that the user may use the air cleaner in various modes.

The air cleaner may have an improved structure, and an entire case of the air cleaner may be used as a suction structure and/or a discharge structure, thereby improving a fluidity of the airflow and quickly cleaning an indoor space. A mode change of the air cleaner may lead to an improvement of suction performance and increase an area to which air may be discharged. An entire area of the air cleaner, (i.e., both upper and lower portions or areas), may contribute to the performance of the air cleaner.

Since the air cleaner may be operated in various modes with respect to a region desired by the user with various discharging structures, satisfaction may be increased. By providing a barrier and/or opening and closing structure, direct air flow and indirect airflow may be selected for each individual, improving satisfaction and customization for a variety of individuals including elderly people, who may have different preferences than other users in a same space.

Embodiments disclosed herein may be implemented as an air purifier comprising a filter configured to filter foreign matter from air, a fan configured to suction air through the filter, a first case at least partially covering the fan and the filter, the first case having a suction portion through which air is suctioned and a side wall, and a second case configured to move in a first direction between a first position and a second position with respect to the first case. The second case may have a plurality of holes formed in a side wall and an upper discharge portion provided above the plurality of holes through which filtered air is discharged. When the second case is moved to the first position, the plurality of holes may overlap with the side wall of the first case. When the second case is moved to the second position, the plurality of holes may be configured to exhaust filtered air.

The first case may include a base provided below a bottom end of the side wall of the first case. The suction portion may include a suction space formed between the base and the bottom end of the side wall such that air is suctioned upward through the suction space.

The suction portion may include a plurality of openings formed in the side wall of the first case such that, when the second case is moved to the first position, a region of the side wall of the second case having the plurality of holes is overlapped with a region of the side wall of the first case having the plurality of holes, and air is suctioned through the plurality of holes and the plurality of openings.

The upper discharge portion may include a top discharge grill provided on a top end of the second case through which air is discharged upward. The upper discharge portion may include a side discharge grill formed in the side wall of the second case through which air is discharged laterally. At least one of the top discharge grill, the side discharge grill, or the plurality of openings formed in the sidewall of the second case is configured to be opened and closed.

A linear motion (LM) guide assembly may be provided. The LM guide assembly may have at least a pinion and gear. The LM guide may be configured to move the second case in the first direction relative to the first case. The first direction may be a vertical direction.

The first case and the second case may have a cylindrical shape. The first case and the second case may have a same geometric center.

Embodiments disclosed herein may be implemented as an air purifier comprising an inner case having a cylindrical shape and at least one air intake, a fan provided in the inner case to suction air through the at least one air intake, a filter provided in the inner case to filter suctioned air through the at least one air intake, and an outer case having a cylindrical shape and at least one air outtake through which filtered air is discharged. The outer case may be provided radially outside of the inner case and be configured to move in an axial direction of the fan between a first position and a second position so as to change a length of overlap between the inner and outer cases.

The at least one air intake of the inner case includes a plurality of first holes formed in a side wall of the inner case. The at least one air intake of the inner case includes an opening through which air is suctioned in the axial direction toward the filter.

The at least one air outtake of the outer case includes a plurality of second holes formed in a side wall of the outer case at positions such that, when the outer case is moved to the second position, at least some of the plurality of second holes do not overlap with a side wall of the inner case.

The at least one outtake of the outer case may include an end discharge grill provided at an end of the outer case at an outlet side of the fan such that air is discharged through the end discharge grill in the axial direction, and a side discharge opening formed in a side wall of the outer case through which air is discharged radially outward.

A cover may be coupled to an inner surface of the outer case and provided to face the end discharge grill. A shutter having at least two variable wings may be provided in an inner space of the cover. The wings may be configured to pivot about a fixed axis along the axial direction to expand and contract a size of an aperture formed at a center of the shutter.

A door may face an inner surface of the outer case. The door may have a rack provided on an inner surface of the door. A motor support may be coupled to the second case. A motor may be coupled to the motor support. A pinion may be driven by the motor and may be configured to engage with the rack to move the door in the axial direction to open and close the side discharge grill.

Embodiments disclosed herein may be implemented as an air purifier comprising a first case having a suction portion including a plurality of first holes through which air is suctioned, a fan and a filter provided inside of the first case to suction and filter air, respectively, and a second case having a plurality of second holes. The second case may be slideably coupled to the first case to move relative to the first case so that an amount of overlap between the first and second holes is adjusted based on a movement of the second case.

A discharge grill may be provided at an end of the second case to face an outlet of the fan. A plurality of ring-shaped openings may be formed in a side wall of the second case above the plurality of second holes and below the discharge grill.

A suction space may be formed at a bottom of the first case. A base may be provided below the first case. A side of the base may have a concave curvature so as not to obstruct the suction space.

When the second case is moved to a first position, the second holes may be provided at an intake side of the fan so as to serve as air intakes. When the second case is moved to a second position, the second holes may be provided at an outtake side of the fan so as to serve as air outtake. When the second case is moved to a third position between the first and second positions, some of the second holes may be provided at the intake side of the fan and some of the second holes may be provided at the outtake side of the fan.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifier, comprising:
   a filter configured to filter foreign matter from air;
   a fan configured to suction air through the filter;
   a first case at least partially covering the fan and the filter, the first case having a suction portion through which air is suctioned and a side wall; and
   a second case configured to move in a first direction between a first position and a second position with respect to the first case, the second case having a plurality of holes formed in a side wall and an upper discharge portion provided above the plurality of holes through which filtered air is discharged,
   wherein when the second case is moved to the first position, the plurality of holes overlaps with the side wall of the first case, and when the second case is moved to the second position, plurality of holes are configured to exhaust filtered air, and
   wherein the suction portion includes a plurality of openings formed in the side wall of the first case such that, when the second case is move to the first position, a region of the side wall of the second case having the plurality of holes overlapped with a region of the side wall of the first case having the plurality of openings and air is suctioned through the plurality of holes and the plurality of openings.

2. The air purifier of claim 1, wherein the first case includes a base provided below a bottom end of the side wall of the first case, and the suction portion includes a suction space formed between the base and the bottom end of the side wall such that air is suctioned upward through the suction space.

3. The air purifier of claim 1, wherein the upper discharge portion includes a top discharge grill provided on a top end of the second case through which air is discharged upward.

4. The air purifier of claim 3, wherein the upper discharge portion includes a side discharge grill formed in the side wall of the second case through which air is discharged laterally.

5. The air purifier of claim 4, wherein at least one of the top discharge grill, the side discharge grill, or a plurality of openings formed in the sidewall of the second case is configured to be opened and closed.

6. The air purifier of claim 1, further comprising a linear motion (LM) guide assembly having at least a pinion or gear and configured to move the second case in the first direction relative to the first case, the first direction being a vertical direction.

7. The air purifier of claim 1, wherein the first case and the second case have a cylindrical shape.

8. The air purifier of claim 7, wherein the first case and the second case have a same geometric center.

9. An air purifier, comprising:
   an inner case having a cylindrical shape and at least one air intake;
   a fan provided in the inner case to suction air through the at least one air intake;
   a filter provided in the inner case to filter suctioned air through the at least one air intake; and
   an outer case having a cylindrical shape and at least one air outtake through which filtered air is discharged, the outer case provided radially outside of the inner case and being configured to move in an axial direction of the fan between a first position and a second position so as to change a length of overlap between the inner and outer cases, wherein the at least one outtake of the outer case includes:
an end discharge grill provided at an end of the outer case at an outlet side of the fan such that air is discharged through the end discharge grill in the axial direction; and
a side discharge opening formed in a side wall of the outer case through which air is discharged radially outward.

10. The air purifier of claim 9, wherein the at least one air intake of the inner case includes a plurality of first holes formed in a side wall of the inner case.

11. The air purifier of claim 9, wherein the at least one air intake of the inner case includes an opening through which air is suctioned in the axial direction toward the filter.

12. The air purifier of claim 9, wherein the at least one air outtake of the outer case includes a plurality of holes formed in a side wall of the outer case at positions such that, when the outer case is moved to the second position, at least some of the plurality of holes do not overlap with a side wall of the inner case.

13. The air purifier of claim 9, further comprising:
a cover coupled to an inner surface of the outer case and provided to face the end discharge grill; and
a shutter having at least two variable wings provided in an inner space of the cover, wherein the wings are configured to pivot about a fixed axis along the axial direction to expand and contract a size of an aperture formed at a center of the shutter.

14. The air purifier of claim 9, further comprising:
a door facing an inner surface of the outer case, the door having a rack provided on an inner surface of the door;
a motor support coupled to the second case;
a motor coupled to the motor support; and
a pinion driven by the motor and configured to engage with the rack to move the door in the axial direction to open and close the side discharge grill.

15. An air purifier, comprising:
a first case having a suction portion including a plurality of first holes through which air is suctioned;
a fan and a filter provided inside of the first case to suction and filter air, respectively; and
a second case having a plurality of second holes, the second case being slideably coupled to the first case to move relative to the first case so that an amount of overlap between the first and second holes is adjusted based on a movement of the second case,
wherein:
when the second case is moved to a first position, the second holes are provided at an intake side of the fan so as to serve as air intakes;
when the second case is moved to a second position, the second holes are provided at an outtake side of the fan so as air outtakes; and
when the second case is moved to a third position between the first and second positions, some of the second holes are provided at the intake side of the fan and some of the second holes are provided at the outtake side of the fan.

16. The air purifier of claim 15, further comprising:
a discharge grill provided at an end of the second case to face an outlet of the fan; and
a plurality of ring-shaped openings formed in a side wall of the second case above the plurality of second holes and below the discharge grill.

17. The air purifier of claim 15, further comprising:
a suction space formed at a bottom of the first case; and
a base provided below the first case, a side of the base having a concave curvature so as not to obstruct the suction space.

* * * * *